(12) United States Patent
Bridges et al.

(10) Patent No.: US 8,051,575 B2
(45) Date of Patent: Nov. 8, 2011

(54) MOUNTED SCALE BAR

(75) Inventors: Robert E. Bridges, Kenneth Square, PA (US); Richard D. Lort, III, Huntsville, AL (US)

(73) Assignee: Faro Technologies, Inc., Lake Mary, FL (US)

( * ) Notice: Subject to any disclaimer, the term of this patent is extended or adjusted under 35 U.S.C. 154(b) by 0 days.

(21) Appl. No.: 12/907,658

(22) Filed: Oct. 19, 2010

(65) Prior Publication Data

US 2011/0088271 A1 Apr. 21, 2011

Related U.S. Application Data

(60) Provisional application No. 61/253,295, filed on Oct. 20, 2009.

(51) Int. Cl.
*B26D 7/28* (2006.01)
(52) U.S. Cl. ............................. 33/502; 33/702
(58) Field of Classification Search ............... 33/502, 33/702, 293, 536, DIG. 1
See application file for complete search history.

(56) References Cited

U.S. PATENT DOCUMENTS

| 4,932,136 | A | | 6/1990 | Schmitz et al. | |
|---|---|---|---|---|---|
| 5,189,807 | A | * | 3/1993 | Gustafsson | 33/702 |
| 5,430,948 | A | | 7/1995 | Vander Wal, III | |
| 6,964,113 | B2 | | 11/2005 | Bridges et al. | |
| 2002/0148133 | A1 | | 10/2002 | Bridges et al. | |
| 2008/0295352 | A1 | * | 12/2008 | Brunson | 33/702 |

FOREIGN PATENT DOCUMENTS

DE 3024560 A1 1/1982

OTHER PUBLICATIONS

International Search Report & Written Opinion for International Application No. PCT/US2010/053300 filed Oct. 20, 2010.
J.E. Furse, "Kinematic Design of Flne Mechanisms in Instruments"; Journal of Physics E—Scientific Instruments, vol. 14, Mar. 1981, p. 264-272.
Giesen et al., "Design guidelines for thermal stability in opto-mechanical instruments"; Proceedings of SPIE vol. 5176 Optomechanics 2003, edited by Alson E. Hatheway; 126-134.
Layton Carter Hale, "Principles and Techniques for Designing Precision Machines"; Thesis (Ph.D.)—Massachusetts Institute of Technology, Dept. of Mechanical Engineering, 1999; 177-179.
Hubbs-Optical Targeting Specialties for Metrology Support Systems, [online]; [retrieved on Oct. 17, 2010]; retrieved from the Internet http://www.hubbsmachine.com/categories/view/laser-tracker-15-sphere-mounts—accessory.
Micro Inch Positioning with Kinematic Components, [online]; [retrieved on Oct. 17, 2010]; retrieved from the Internet http://www.precisionballs.com/Micro_Inch_Positioning_with_Kinematic_Components.html.
Kinematic Couplings for Synchrotron Radiation Instrumentation, [online]; [retrieved on Oct. 19, 2010]; retrieved from the Internet http://www.aps.anl.gov/APS_Engineering_Support_Division/Mechanical_Operations_and_Maintenance/medsi02/papers/MED004.pdf.

* cited by examiner

*Primary Examiner* — Yaritza Guadalupe-McCall
(74) *Attorney, Agent, or Firm* — Cantor Colburn LLP

(57) ABSTRACT

A scale-bar artifact can include a base, a structural component, at least two nests disposed on the structural component and configured to receive a spherically shaped object having a center, and at least three mounting assemblies, each mounting assembly including a first portion and a second portion. The second portion of each mounting assembly is coupled to the base. The first portion of each mounting assembly is coupled to the structural component. The first portion and second portion of each mounting assembly are in mutual contact. Each mounting assembly has a center of rotation. The centers of rotation of the three mounting assemblies share a common plane with the centers of the spherically shaped objects.

16 Claims, 7 Drawing Sheets

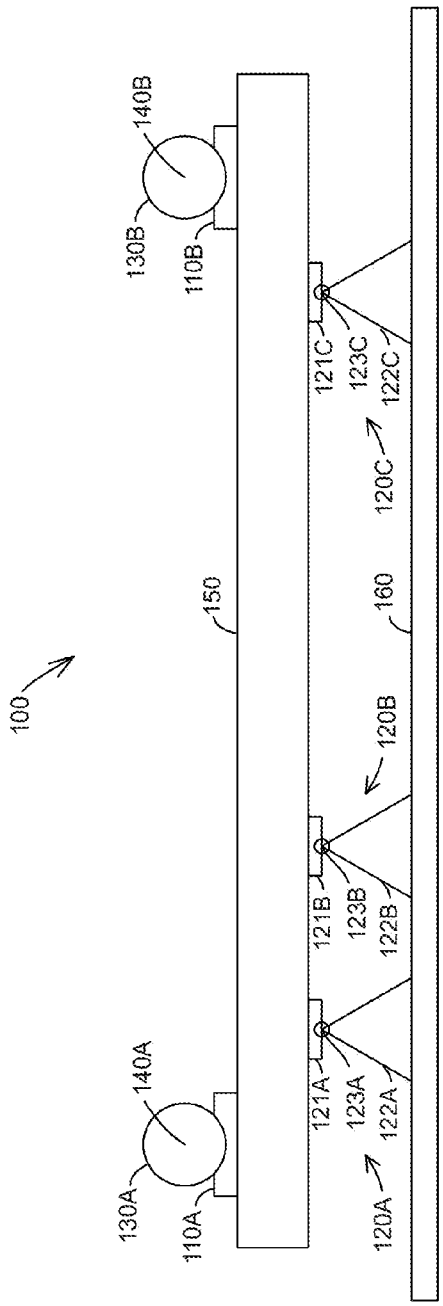
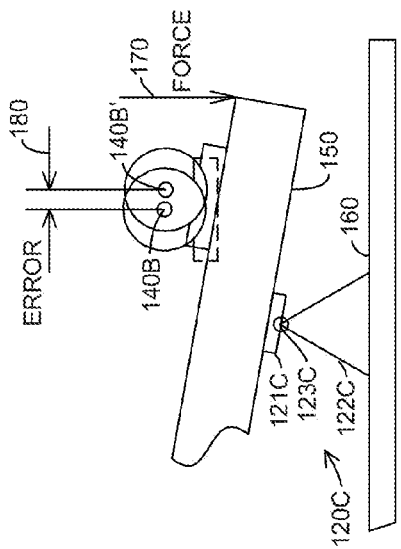

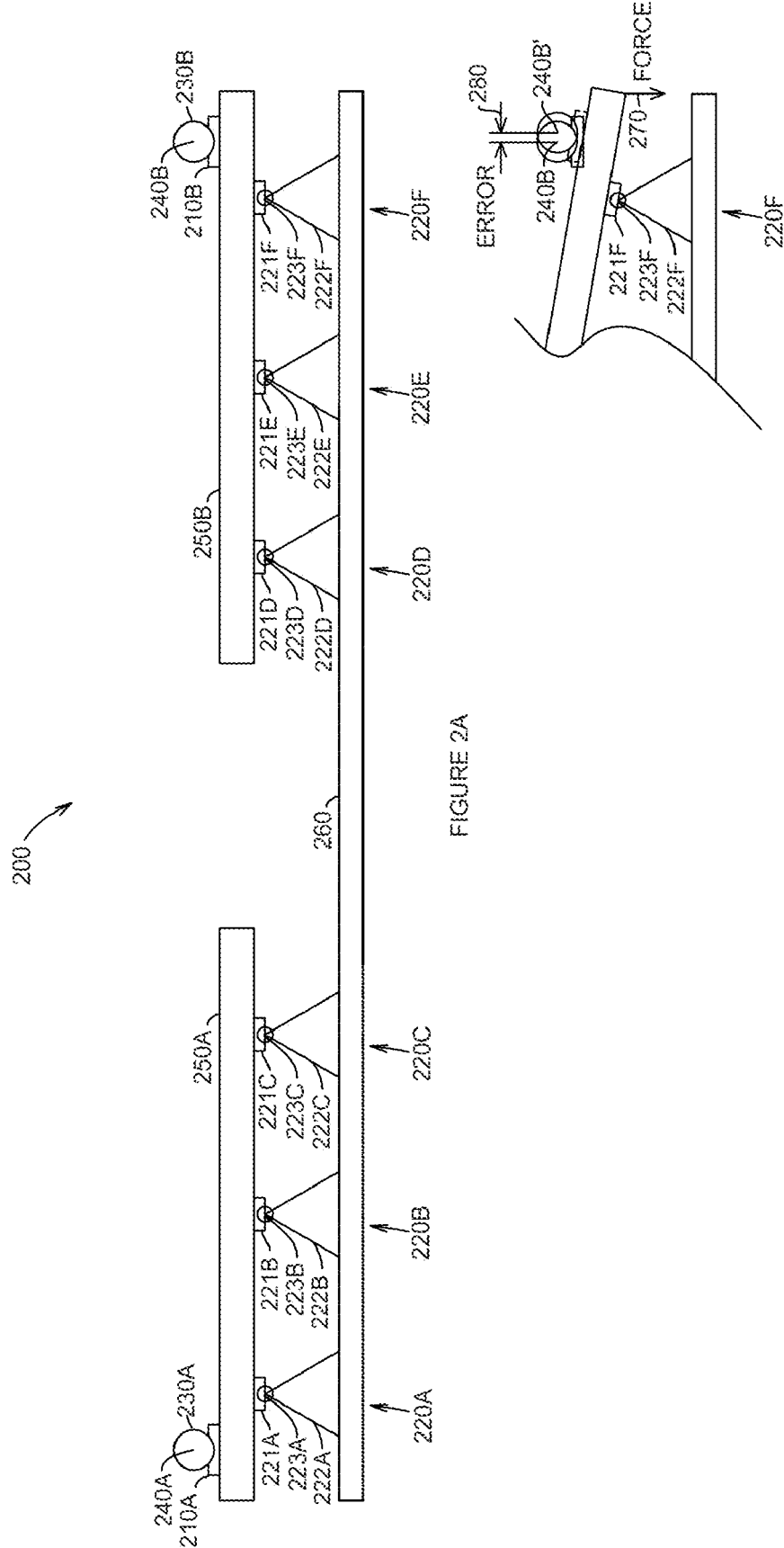

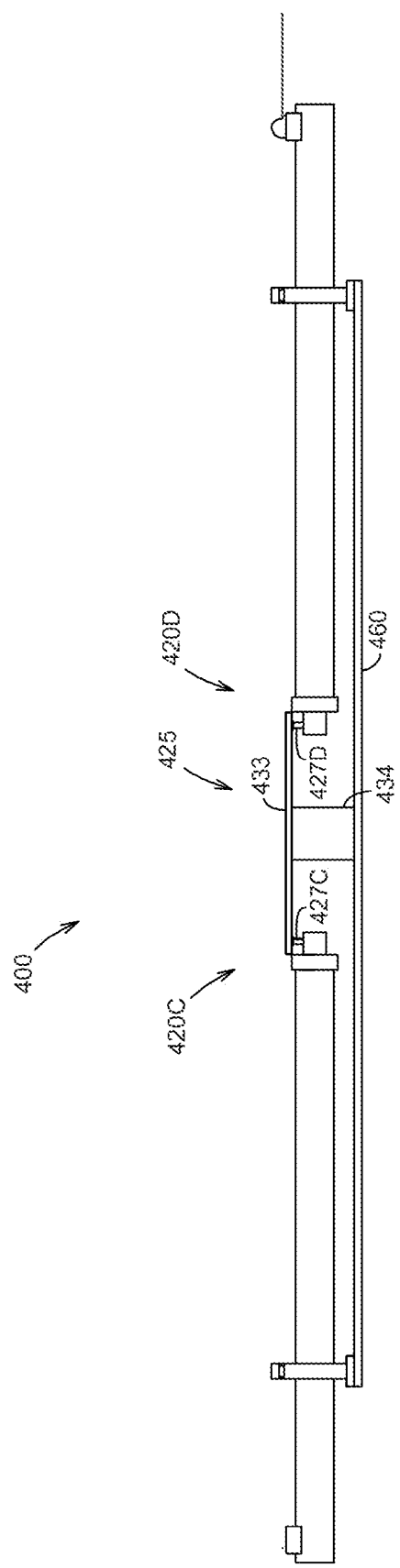

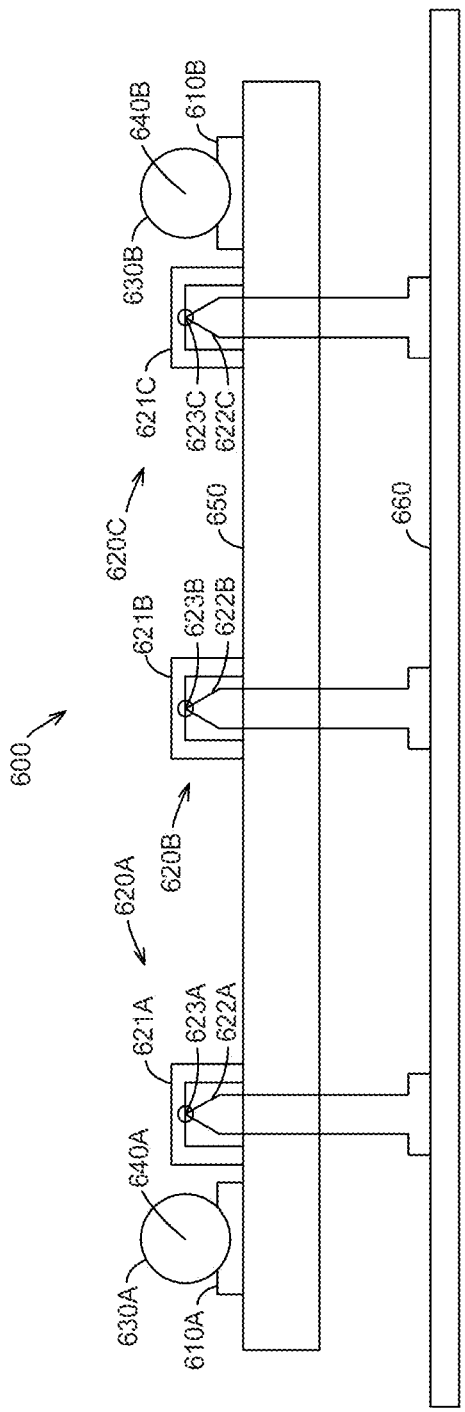
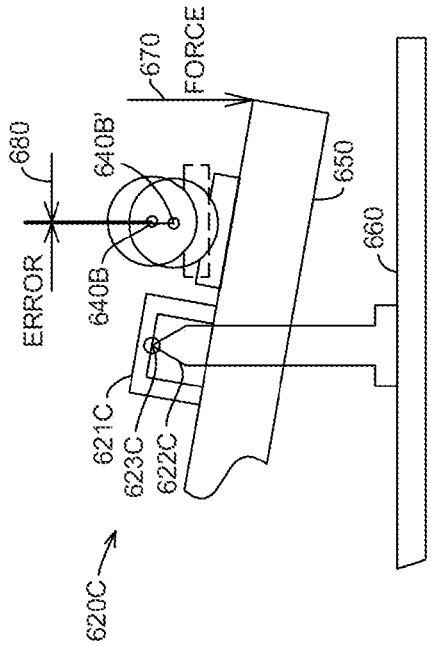
FIGURE 6A
FIGURE 6B

MOUNTED SCALE BAR

CROSS-REFERENCE TO RELATED APPLICATIONS

This application claims the benefit of U.S. Provisional Application Ser. No. 61/253,295 entitled "SCALE BAR", filed Oct. 20, 2009, which is incorporated herein by reference in its entirety.

FIELD OF INVENTION

The present disclosure relates to scale-bar artifacts used in the calibration of dimensional measuring devices.

BACKGROUND

A variety of artifacts are available to measure dimensional measuring devices such as coordinate measuring machines (CMM), articulated arm CMMs, laser trackers, and 3D scanners. Many types of artifacts are available including scale bars, ball bars, gage blocks, step gages, and ball plates.

One type of scale bar includes a bar onto which are mounted two or more nests, each of which can hold an object having a spherical shape. One conventional method to accurately measure the distance between the centers of spheres held in the nests includes using a calibrated interferometer within a laser tracker. A laser tracker is a device that measures the distance and two angles to a retroreflector target, which is usually a spherically mounted retroreflector (SMR). An SMR includes a cube corner retroreflector embedded within a steel sphere with the vertex of the cube corner at the center of the sphere. By lining up the laser tracker with the positions of the SMRs on the scale bar, a very accurate measurement based on tracker interferometer readings can be obtained.

To measure the distance between the centers of the nests on the scale bar, the operator aligns the laser beam with the SMR when mounted on each of the two nests. The operator reads the distance to the SMR at the first nest and then moves the SMR to the second nest without allowing the laser beam to break, which would result in count loss and invalidate the measurement. The operator then reads the distance to the second nest. The difference between the measured distances is the distance between the two nest centers. To make this SMR movement possible, the scale bar is designed to permit the laser beam from the tracker to travel between nest centers without encountering any obstructions.

Most scale bars are designed to sit on kinematic mounts. Kinematic mounts enable the scale bar to be removed and then be reseated in the same position. Conventionally, there are many kinematic mounting methods. One method brings a sphere on a first mount in contact with a plane, a sphere on a second mount in contact with a V-block, and a sphere on a third mount in contact with three smaller spheres located 120 degrees apart. The scale bar can be mounted on a flat surface such as a table. The three larger spheres can be mounted on the bottom of the scale bar and the three complementary surfaces (plane, V-block, 3-sphere structure) can be placed on the table in contact with the larger spheres. A first alternative is to mount the larger spheres on the table and the three complementary surfaces on the bottom of the scale bar. A second alternative is to mount some of the larger spheres on the table and others on the bottom of the scale bar.

Regardless of selected method, the principle involved in kinematically mounting a rigid body is to fully constrain, but not over-constrain, the rigid body. A rigid body—in this case the scale bar—has six degrees of freedom that need to be eliminated to fully constrain without over-constraining. The mount with the three small spheres constrains the larger sphere so that translational motion is not possible at the position of the larger sphere. In other words, three of the six degrees of freedom of the scale bar have been removed. The mount with the V-block constrains the second sphere to move along a straight line, thereby removing two more degrees of freedom. The mount with the flat surface constrains the third sphere to move on a plane, thereby removing one degree of freedom. By using the three mounts together, six degrees of freedom are removed, and the scale bar is fully constrained, but not over-constrained.

Another kinematic mounting method uses three pairs of cylinder, each pair spaced 120 degrees away from the other pairs and each pair pointed toward a central point. Each of the three pairs of cylinders is brought in contact with a sphere. As each cylinder constrains the sphere to move along a straight line, each removes two degrees of freedom, so that the three mounts, when placed between the scale bar and table, fully constrain motion of the scale bar.

Usually the three mounts are placed opposite the side of the scale bar that holds the magnetic nests as described herein. For example, if the mounts are placed on the bottom of the scale bar, the nests are placed on the top of the scale bar. This positioning of the mounts on the side opposite the nests prevents the laser beam from being broken as the SMR is moved from one nest to the other.

However, this placement of the mounts on the side of the scale bar opposite the nests may increase errors in the use of the scale bar. One such error occurs when forces applied to the bar causes the bar to bend. Such forces may be applied by the operator when the operator touches the scale bar with a probe of the instrument under test (for example, the probe on an articulated arm coordinate measuring machine (CMM)). Alternatively, such forces may come from gravity as the scale bar is moved to different orientations, or they may come from thermal expansion of the base element to which the scale bar mounts are attached.

An additional type of error can occur for the case of a scale bar that includes two scale bar segments mounted on a supporting structure. In this case, forces on the structure can cause movement of one of the segments, thereby resulting in a change in the length between the centers of the nests.

There is a need today for an artifact that (1) resists changes in length as forces are applied to it and (2) is free of obstructions, thereby permitting measurement of the distances between nests centers with a laser tracker interferometer.

SUMMARY OF THE INVENTION

Exemplary embodiments include a scale-bar artifact, having a base, a structural component, at least two nests disposed on the structural component and configured to receive a spherically shaped object having a center, and at least three mounting assemblies, each mounting assembly including a first portion and a second portion. The second portion of each mounting assembly is coupled to the base. The first portion of each mounting assembly is coupled to the structural component. The first portion and second portion of each mounting assembly are in mutual contact. Each mounting assembly has a center of rotation. The centers of rotation of the three mounting assemblies share a common plane with the centers of the spherically shaped objects.

Additional exemplary embodiments include a scale-bar artifact having a base, a first structural component section and a second structural component section, at least two nests configured to receive a spherically shaped object having a center, wherein a first of the at least two nests is coupled to the first structural component section and a second of the at least two nests is coupled to the second structural component section, and a first set of at least three mounting assemblies and a second set of at least three mounting assemblies, each mounting assembly including a first portion and a second portion. The second portion of each mounting assembly is coupled to the base. The first portion of each mounting assembly within the first set of three mounting assemblies is coupled to the first structural component section. The first portion of each mounting assembly within the second set of three mounting assemblies is coupled to the second structural component section. The first portion and second portion of each mounting assembly are in mutual contact. Each mounting assembly has a center of rotation. The centers of rotation of the mounting assemblies from among the first set of at least three mounting assemblies and the second set of at least three mounting assemblies and the centers of the spherically shaped objects share a common plane.

BRIEF DESCRIPTION OF THE DRAWINGS

Referring now to the drawings, exemplary embodiments are shown which should not be construed to be limiting regarding the entire scope of the disclosure, and wherein the elements are numbered alike in several FIGURES:

FIGS. 1A and 1B are schematic diagrams showing how a force applied to a scale bar can cause changes in the distance between nest centers;

FIGS. 2A and 2B are schematic diagrams showing how a force applied to the support structure of a segmented scale bar can cause change in the distance between nest centers;

FIG. 5 is a front view of an exemplary mounted artifact including two segments;

FIGS. 6A and 6B are schematic diagrams showing how the artifact may be mounted to minimize errors caused by application of a force.

DETAILED DESCRIPTION OF THE PREFERRED EMBODIMENTS

Figure 3:
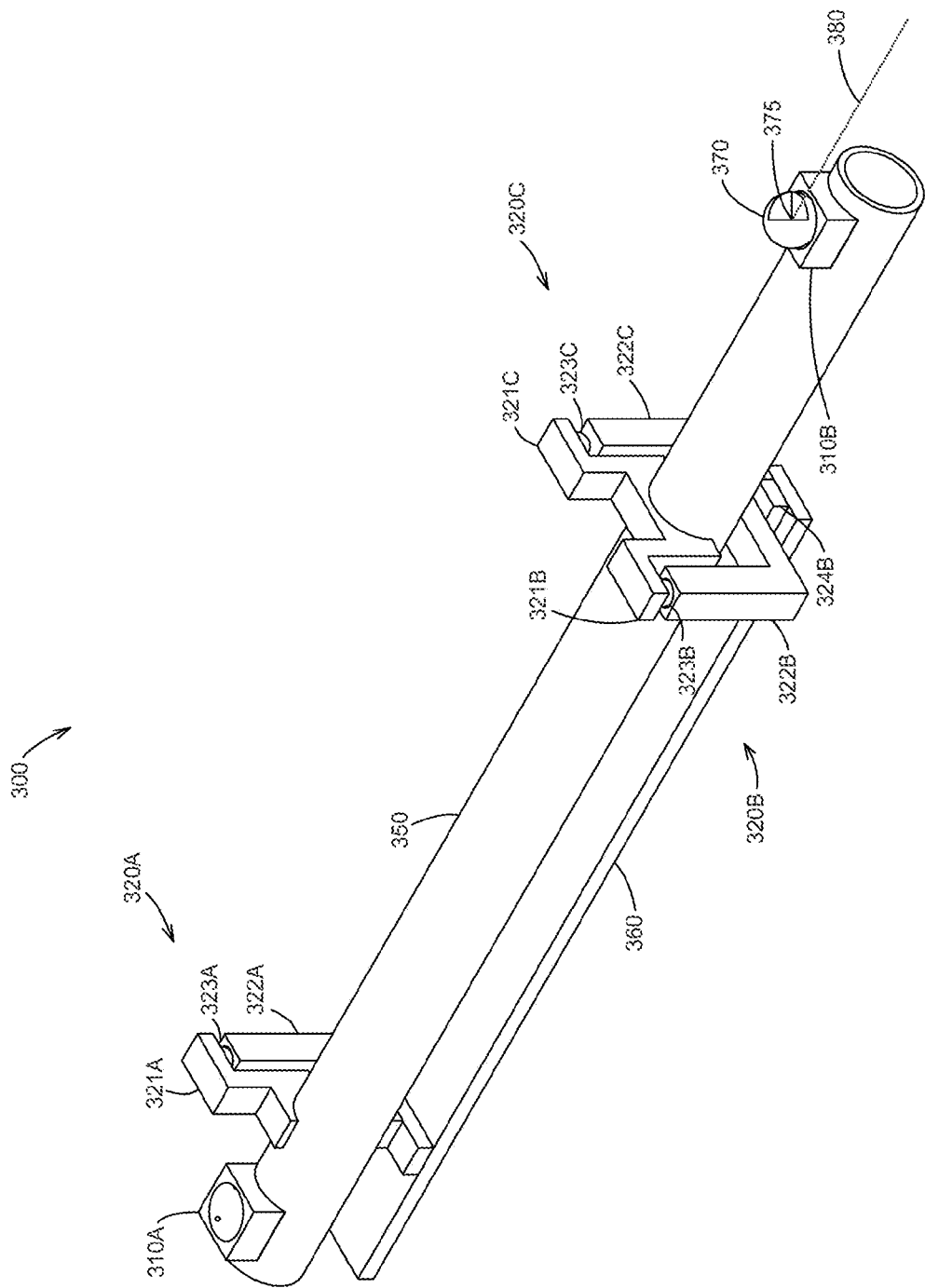
FIG. 3 is a perspective view of a an exemplary mounted artifact (scale bar) including one segment.

Exemplary embodiments include mounted artifacts that resist changes in length as forces are applied to it, thereby greatly reducing Abbe errors, as will be described below. As described herein, alignment of centers of rotations of mounting assemblies with centers of spherically shaped objects reduce Abbe errors as forces are applied to the mounted artifact. The exemplary mounted artifacts described herein are also free of obstructions, thereby providing an unobstructed line of sight thereby permitting measurement of the distances between nests centers with a laser tracker interferometer.

FIG. 1A shows a schematic view of mounted artifact 100, which includes a structural component 150, nests 110A, 110B disposed on the structural component 150, mount assemblies 120A, 120B, 120C onto which the structural component 150 is mounted, and a base 160 supporting the mount assemblies 120A, 120B, 120C. Each of the mount assemblies 120A, 120B, 120C includes a first portion, 121A, 121B, 121C, and a second portion 122A, 122B, 122C. The first portions 121A, 121B, 121C of each respective mount assembly 120A, 120B, 120C attaches to structural component 150. The second portions 122A, 122B, 122C of each respective mount assembly 120A, 120B, 120C attaches to base 160. The first portions 121A, 121B, 121C and second portions 122A, 122B, 122C of each assembly 120A, 120B, 120C are in mutual contact.

In addition, each mount assembly 120A, 120B, 120C has a center of rotation 123A, 123B, 123C. The three centers of rotation are not collinear. As described herein, many common types of kinematic mounting structures contain a sphere about which the upper portion and lower portion rotate. For this situation, the center of the sphere is also the center of rotation of the mount assembly. For example, one type of mount assembly described herein contains three small spheres spaced from one another by 120 degrees, upon which a larger sphere is placed. As a particular case, the first portion of the mount assembly might attach to the large sphere and the second portion might attach to the three smaller spheres. With the first and second portions in mutual contact, it would be possible to rotate the first portion or second portion about the other. Regardless, the center of rotation in each case would be the center of the large sphere. As described herein, in FIG. 1A each mount assembly 120A, 120B, 120C has a center of rotation 123A, 123B, 123C. However, it is to be appreciated that a mount assembly need not contain a sphere to have a center of rotation. Any rotation about a point, regardless of the mechanism, is regarded as a center of rotation for a mount assembly.

Each of the nests 110A, 110B is configured to accept a spherically shaped object 130A, 130B having a center 140A, 140B. The spherically shaped object 130A, 130B might be, for example, a steel sphere or a spherically mounted retroreflector (SMR). The nests 110A, 110B each can include one or more magnets to apply force to hold a ferromagnetic spherically shaped object. The magnets can be integrally included with the nests 110A, 110B, or can be an additional component of the nests 110A, 110B.

FIG. 1B shows a schematic view of the right portion of scale bar 100 after a force 170 has been applied. The effect of the force 170 is to cause a bending of structural component 150. As a result of this bending, center 140B of spherically shaped object 130B moves to new center position 140B', and some of this movement is along the direction of the artifact. This type of error 180, which in this case results in a change in distance between sphere centers 140A, 140B, is often referred to as Abbe error. The purpose of artifact 100 is to faithfully represent the calibrated reference distance between the centers of the two nests 110A, 110B. Consequently, the change in the distance, due to the error 180, between the nests 110A, 110B as a result of the applied force 170 is highly undesirable.

FIG. 2A shows a schematic view of mounted artifact 200, which includes structural components 250A, 250B, nests 210A, 210B disposed on the structural components 250A, 250B, mount assemblies 220A, 220B, 220C, 220D, 220E, 220F, and a base 260. As illustrated the structural component 250A is mounted on mount assemblies 220A, 220B, 220C and the structural component 250B is mounted on mount assemblies 220D, 220E, 220F. Each of the mount assemblies 220A, 220B, 220C, 220D, 220E, 220F includes a first portion, 221A, 221B, 221C, 221D, 221E, 221F, and a second portion 222A, 222B, 222C, 222D, 222E, 222F. The first portion 221A, 221B, 221C, 221D, 221E, 221F of each mount assembly 220A, 220B, 220C, 220D, 220E, 220F attaches to a respective structural component 250A, 250B. The second portion 222A, 222B, 222C, 222D, 222E, 222F of each mount assembly 220A, 220B, 220C, 220D, 220E, 220F attaches to the base 260. The first portion 221A, 221B, 221C, 221D, 221E, 221F and second portion 222A, 222B, 222C, 222D, 222E, 222F of each assembly 220A, 220B, 220C, 220D, 220E, 220F, are in mutual contact. The mount assemblies 220A, 220B, 220C, 220D, 220E, 220F respectively include centers of rotation 223A, 223B, 223C, 223D, 223E, 223F. The centers of rotation 223A, 223B, 223C are not collinear. The centers of rotation 223D, 223E, 223F are not collinear.

Each of the nests 210A, 210B is configured to accept a spherically shaped object 230A, 230B, each having a center 240A, 240B. The spherically shaped object 230A, 230B can be, for example, a steel sphere or a SMR. The nests 210A, 210B each can include one or more magnets to apply a force to hold a ferromagnetic spherically shaped object in place. The magnets can be integrally included with the nests 210A, 210B, or can be an additional component of the nests 210A, 210B.

FIG. 2B shows a schematic view of the right portion of mounted artifact 200 after a force 270 has been applied to structural component 250B. Bending occurs as a result of this force, with some of the resulting movement of spherically shaped object 230B to new center position 240B' along the direction of the artifact. This movement produces an error 280 caused by the change in the distance between sphere centers 240A, 240B and is another example of Abbe error. As described herein, a purpose of the artifact 200 is to faithfully represent the calibrated reference distance between the centers of the two nests 210A, 210B. Once again, the change in the distance, due to the error 280, between the nests 210A, 210B as a result of the applied force 270 is undesirable.

FIG. 3 is a perspective view of an exemplary mounted artifact 300, which includes a structural component 350, nests 310A, 310B disposed on the structural component 350, mount assemblies 320A, 320B, 320C onto which the structural component 350 is mounted, and base 360. Each of the mount assemblies 320A, 320B, 320C includes a first portion 321A, 321B, 321C, and a second portion, 322A, 322B, 322C. The first portion 321A, 321B, 321C of each mount assembly 320A, 320B, 320C attaches to the structural component 350. The second portions 322A, 322B, 322C of each mount assembly 320A, 320B, 320C attaches to base 360. The first portions 321A, 321B, 321C and the second portions 322A, 322B, 322C of each mount assembly 320A, 320B, 320C are in mutual contact. The mount assemblies 320A, 320B, 320C include centers of rotation 323A, 323B, 323C.

Each of the nests 310A, 310B is configured to accept a spherically shaped object. FIG. 3 shows the case in which the spherically shaped object is spherically mounted retroreflector (SMR) 370. A laser beam 380, which may come from a laser tracker, is directed toward SMR center 375. To find the distance between the centers of spherically shaped objects mounted on nests 310A, 310B, the operator first aligns the laser beam 380 in a straight line that passes through the center of an SMR 370 when placed in each of the two nests 310A, 310B. The operator uses the laser tracker to measure the distance from the tracker to SMR center 375 with the SMR 370 sitting on nest 310B. The operator next moves the laser beam 380 to nest 310A while the laser beam 380 tracks the position of SMR 370. After the SMR 370 is seated in nest 310A, the tracker reads the distance again. The difference in interferometer distance readings at the near and far nests, that is, the nests 310A, 310B, is an accurate measure of the distance between the centers of two spherically shaped objects mounted on nests 310A, 310B.

In exemplary embodiments, the structural component 350 may have any cross section and be made of any material but preferably is a tube of carbon fiber composite material having high stiffness and low coefficient of thermal expansion (CTE). CTE is a measure of the relative change in length of the material per change in temperature. Some carbon fiber composite materials have a CTE less than $10^{-6}/^\circ$ C. In exemplary embodiments, the nests 310A, 310B can include a magnet that hold a steel SMR or sphere in place even as the artifact 300 is tipped. In exemplary embodiments, the nests 310A, 310B are preferably kinematic so that an SMR 370 or other desirable spherically shaped object can be removed and repeatedly returned to the same location with very little change in coordinates of the SMR 370 or sphere center 375. A common type of kinematic mount for holding spherical surfaces into a nest is a three point mount. Often, three spheres are mounted in the nest to provide these three points of contact. The spheres can be separated from one another by 120 degrees.

For the embodiment shown in FIG. 3, the first portion 321B is combined with the first portion 321C in a single structure, and the second portion 322B is combined with the second portion 322C in a single structure. It is to be appreciated that in other exemplary embodiments, the mount assemblies 320B and 320C can be separately mounted to structural component 350 and base 360, similar to how mount assembly 320A is illustrated in FIG. 3. It is to be appreciated that the mount assemblies 320A, 320B, 320C as illustrated in FIG. 3 can be any mounting structure known in the art. In exemplary embodiments the mount assemblies 320A, 320B, 320C are kinematic mounting structures. For example, in the embodiment of FIG. 3, mount assembly 320A can include a large sphere in contact with three small spheres, as known in the art. The mount assembly 320B can also include a large sphere in contact with three small spheres, but can further include a ball slide 324B. The ball slide 324B moves smoothly with low friction along a straight line. Because the ball slide 324B is constrained in only two degrees of freedom, while the three point spherical mount is constrained in three degrees of freedom, the mount assembly 320B is constrained by two degrees of freedom overall. As such, the mount assembly 320B can be equivalent to a V-block mount, which also has two degrees of freedom. The mount assembly 320C can include a sphere in contact with a flat. With this combination of mount assemblies, the artifact (i.e., scale bar) 300 is fully constrained but not over-constrained. Note that since mount assemblies 320B and 320C are connected, ball slide 324B can be placed in contact with the connected structure. As described herein, it is appreciated that any type of mounting structure is contemplated in other exemplary embodiments.

FIGS. 6A, 6B schematically illustrate several advantages of the exemplary mounted artifact (i.e., scale bar) 300 of FIG. 3. In FIGS. 6A, 6B, an exemplary artifact 600 includes a structural component 650, nests 610A, 610B disposed on the structural component 650, mount assemblies 620A, 620B, 620C onto which the structural component 650 is mounted, and base 660. Each of the mount assemblies 620A, 620B, 620C includes a first portion 621A, 621B, 621C, and a second portion, 622A, 622B, 622C. The first portion 621A, 621B, 621C of each mount assembly 620A, 620B, 620C attaches to the structural component 650. The second portions 622A, 622B, 622C of each mount assembly 620A, 620B, 620C attaches to base 660. The first portions 621A, 621B, 621C and the second portions 622A, 622B, 622C of each mount assembly 620A, 620B, 620C are in mutual contact. The mount assemblies 620A, 620B, 620C include centers of rotation 623A, 623B, 623C. Each of the nests 610A, 610B is configured to accept a spherically shaped object 630A, 630B.

In FIGS. 1A, 1B, a common plane that holds the centers of rotation 123A, 123B, 123C lies between the center 140B of spherically shaped objects 130A, 130B and base 160. In contrast, in FIGS. 6A, 6B, a common plane that holds the centers of rotation 623A, 623B, 623C intersects, at least approximately, centers 640A, 640B, thereby advantageously aligning the centers of rotation 623A, 623B, 623C with the centers 640A, 640B. When, in FIG. 6B, a force 670 is applied to the right side of structural component 650, the sphere 630B moves almost entirely in a vertical direction, causing the sphere center 640B to move from position 640B to position 640B'. This type of change results in an error 680 in the distance between the centers 640B, 640A of spherically shaped objects 630B, 630A. In this case, the error 680 is mostly a cosine error, defined as the difference in length between a hypotenuse and a side of a triangle. Since the triangle in this case is very long and skinny, defined by center of rotation 623C, and centers 640B, 640B', the cosine error is negligible. By comparison, the sphere 130B in FIG. 1B moves partly in the horizontal direction along the structural component 150. This type of change results in an Abbe error 170 in the distance between the centers of spherically shaped objects 140B and 140A. In exemplary embodiments, by aligning the centers of rotation 623A, 623B, 623C of the mount assemblies 620A, 620B, 620C to coincide with the centers 640A, 640B of the spherically shaped objects 630A, 630B, the error in the length between nests 610A, 610B has been greatly reduced.

FIG. 6B illustrates a placement of the center of rotation 623C at such a location that a line connecting the center of rotation 623C to the center 640B of the spherically shaped object 630B is parallel to the structural component 650. While this illustration and corresponding discussion is made with respect to reducing the Abbe error, the locations of the centers of rotation 623A, 623B are pertinent to the discussion. The locations of the centers of rotation 623A, 623B are not unimportant. Referring again to FIG. 3, which is an embodiment FIG. 6 depicts schematically, if the mount assembly 320A were replaced with a mount assembly having a pivot point below structural element 350, certain differences would result. If force were applied to the right side of structural element 350, SMR 370 (or any other spherically shaped object) would pivot on the plane that connects the three rotation centers about the line that connects the rotation centers 323B, 323C. Because of the tilt of the plane that connects the rotation centers, SMR 370 would not rotate straight down, but would instead rotate at an angle. Consequently, the movement of SMR 370 will have a component along the direction of structural element 350, resulting in the unwanted Abbe error. As such, Abbe error is reduced when the centers of spherically shaped objects 630A, 630B placed in nests 610A, 610B lie, at least approximately, on a plane that connects the centers of rotation 623A, 623B, 623C of the mount assemblies 620A, 620B, 620C.

FIGS. 6A and 6B are illustrated as schematic representations of the mounted artifact 300 of FIG. 3. It is therefore appreciated that the principles described with respect to FIGS. 6A and 6B apply to the embodiment of FIG. 3 since the centers of the spherically shaped objects (e.g., the center 375 of the SMR 370) sitting in nests 310A, 310B coincide, at least approximately, with the plane that holds the centers of rotation 323A, 323B, 323C of the mount assemblies 320A, 320B, 320C.

The exemplary mounted scale bars described herein also do not block the path of the laser beam as an SMR (e.g., SMR 375) is moved from nest 320B to 320A. As such, there are no obstructions in the path between the centers of spherically shaped objects sitting in nests 310A, 310B. As such, there is an unobstructed line of sight between the spherically shaped objects. In this way, scale bar 300 can be measured accurately and easily with a laser tracker.

In the exemplary embodiment of FIG. 3, the centers of rotation of the three mount assemblies 320A, 320B, 320C correspond to the centers of spheres. However, it is possible to construct a kinematic structure using rotating elements such as cylinders rather than spheres. For example, one well known type of kinematic mounting arrangement includes three sets of cylinders each mounted on a pair of spheres. Each set is mounted at 120 degrees with respect to the others. In this case, each cylinder has a line of rotation corresponding to its line of symmetry. However, starting from a resting position of the kinematic structure, infinitesimal movements in two of the cylinders away from their mounts will reveal the center of rotation of the third cylinder. In this way, a center of rotation may be identified for each of the three cylinders within the kinematic mounting arrangement. In other words, each cylinder on its own has a line of symmetry rather than a center (or point) of rotation. However, within the context of the kinematic mounting arrangement, each cylinder also has a center (or point) of rotation. This argument may be applied to any type of mounting structure. Within the context of a mounting arrangement, any kinematic mount assembly, regardless of method of construction, may be considered to have a center of rotation.

Figure 4:
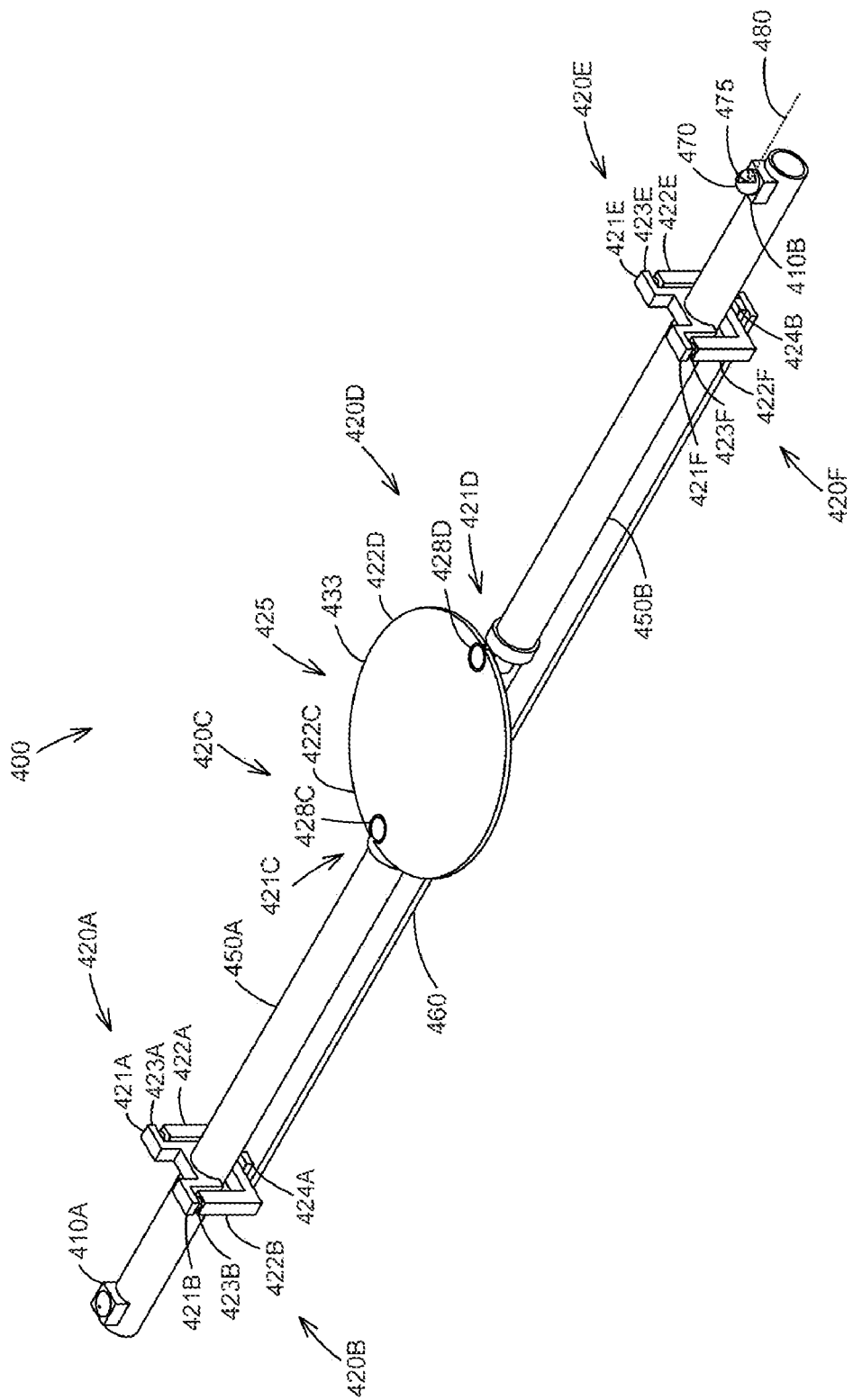
FIG. 4 is a perspective view of an exemplary mounted artifact including two segments.

FIGS. 4 and 5 are perspective and front views, respectively, of a mounted artifact 400, a first structural component section 450A which includes first nest 410A, and a second structural component section 450B which includes a second nest 410B, a first set of mount assemblies 420A, 420B, 420C supporting the first structural component section 450A, a second set of mount assemblies 420D, 420E, 420F supporting the second structural component section 450B, and a base 460 coupled to the mount assemblies 420A, 420B, 420C, 420D, 420E, 420F. Each mount assembly 420A, 420B, 420C, 420D, 420E, 420F includes one of the first portions, 421A, 421B, 421C, 421D, 421E, 421F, and one of the second portions, 422A, 422B, 422C, 422D, 422E, 422F. The first portion 421A, 421B, 421C of each mount assembly in the first set of mount assemblies 420A, 420B, 420C attaches to the first structural component section 450A. The first portion 421D, 421E, 421F of each mount assembly in the second set of mount assemblies 420D, 420E, 420F attaches to the second structural component section 450B. The second portion 422A, 422B, 422C, 422D, 422E, 422F of each mount assembly 420A, 420B, 420C, 420D, 420E, 420F attaches to base 460. The first portion 421A, 421B, 421C, 421D, 421E, 421F and second portion 422A, 422B, 422C, 422D, 422E, 422F of each mount assembly 420A, 420B, 420C, 420D, 420E, 420F are in mutual contact. Each of the mount assemblies 420A, 420B, 420C, 420D, 420E, 420F include centers of rotation 423A, 423B, 423C, 423D, 423E, 423F.

Each of the nests 410A, 410B is configured to accept a spherically shaped object. FIG. 4 shows the case in which the spherically shaped object is spherically mounted retroreflector (SMR) 470. A laser beam 480, which may come from a laser tracker, is directed toward SMR center 475. To find the distance between the centers of spherically shaped objects mounted on nests 410A, 410B, the operator first aligns the tracker so that its laser beam 480 travels on a straight line that passes through the centers of the SMR when mounted on the two nests 410A, 410B. The operator then uses the laser tracker to measure the distance from the tracker to SMR center 475 with the SMR sitting on nest 410B. The operator next moves the laser beam 480 to nest 410A while the laser beam 480 tracks the position of SMR 470. After the SMR 470 is seated in nest 410A, the tracker reads the distance again.

The difference in interferometer distance readings at the near and far nests is an accurate measure of the distance between the centers of two spherically shaped objects mounted on nests 410A, 410B.

In exemplary embodiments, the first structural component section 450A and the second structural component section 450B may have any cross section and be made of any material but are preferably made of a tubular carbon fiber composite material having high stiffness and low coefficient of thermal expansion (CTE). CTE is a measure of the relative change in length of the material per change in temperature. Some carbon fiber composite materials have a CTE less than $10^{-6}/°C$. In exemplary embodiments, the nests 410A, 410B preferably contain a magnet that holds a steel SMR or sphere in place even as the scale bar is tipped. In exemplary embodiments, the nests are preferably kinematic so that an SMR or sphere can be removed and repeatedly returned to the same location with very little change in coordinates of the SMR 470 or sphere center 475. A common type of kinematic mount for holding spherical surfaces into a nest is a three point mount. Often, three spheres are mounted in the nest to provide these three points of contact. The spheres can be separated from one another by 120 degrees.

For the embodiment shown in FIG. 4, the first portion 421A is combined with the first portion 421B in a single structure, and the second portion 422A is combined with the second portion 422B in a single structure. Similarly, the first portion 421E is combined with the first portion 421F in a single structure, and the second portion 422E is combined with the second portion 422F in a single structure. It is to be appreciated that in other exemplary embodiments, that the mount assemblies 420A and 420B could be separately mounted to the first structural component section 450A and the base 460. Similarly, the mount assemblies 420E and 420F could be separately mounted to the second structural component section 450B and base 460. It is to be appreciated that the mount assemblies 420A, 420B, 420C, 420D, 420E, 420F of FIG. 4 can be any mounting structure known in the art. In exemplary embodiments, the mount assemblies 420C, 420D are kinematic mounting structures. For example, in the embodiment of FIG. 4, the mount assemblies 420C, 420D can each include a large truncated sphere in contact with three small spheres, as known in the art. The mount assembly 420B can include a large sphere in contact with three small spheres and, in addition, a ball slide 424A. The mount assembly 420E can include a large sphere in contact with three small spheres and, in addition, a ball slide 424B. The ball slides 424A, 424B move smoothly with low friction along a straight line. Because each ball slide 424A, 424B is constrained in only two degrees of freedom while the three point mount is constrained in three degrees of freedom, the mount assembly 420E is constrained by two degrees of freedom overall. As such, the mount assembly 420E is equivalent to a V-block mount, which also has two degrees of freedom. The mount assembly 420C can include a sphere in contact with a flat. With this combination of mount assemblies 420A, 420B, 420C, 420D, 420E, 420F, the artifact (i.e., scale bar) 400 is fully constrained but not over-constrained. Note that since the mount assemblies 420B, 420C are combined, the ball slide 424A can be placed in contact with the connected structure. Similarly, the ball slide 424B can be placed in contact with the connected structure that includes 420E and 420F. As described herein, it is appreciated that any type of mounting structure is contemplated in other exemplary embodiments.

Figure 7:
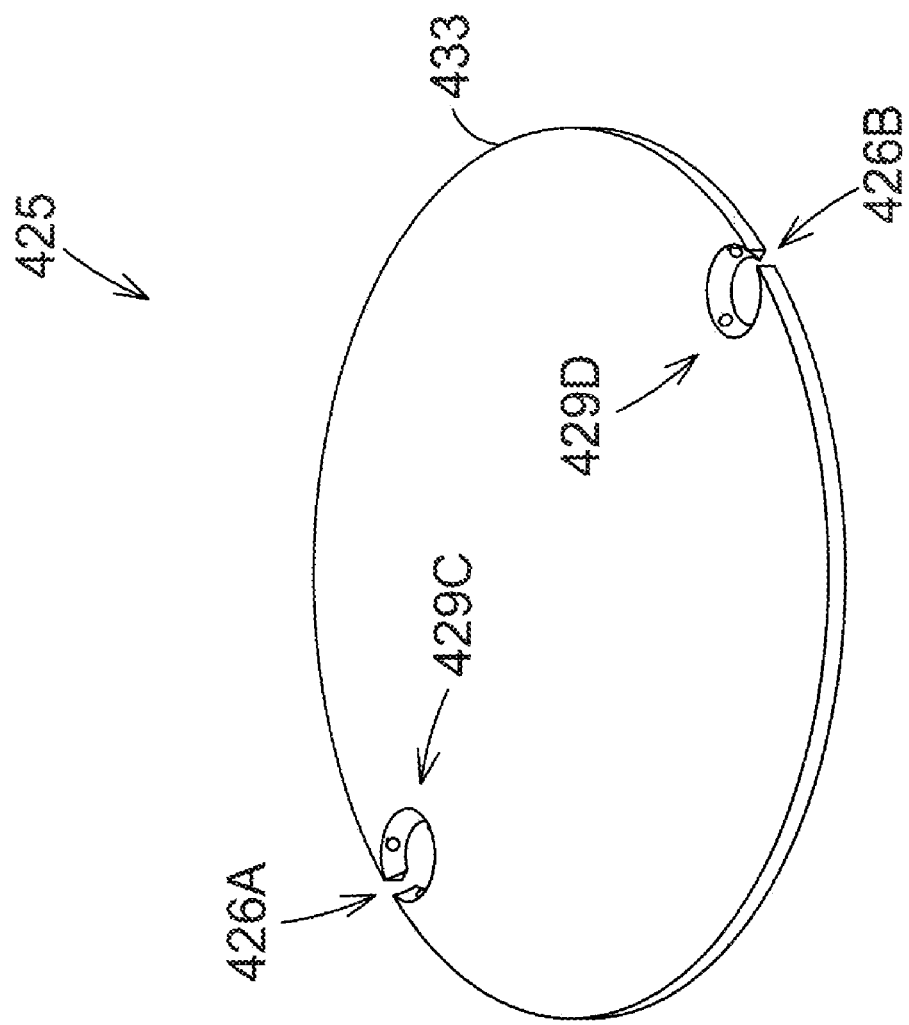
FIG. 7 is a top view of a structure that combines a top portion of two mounting assemblies.

FIG. 4 shows that second portions 422C and 422D are combined in one structure 425 that mounts to base 460. The front view of FIG. 5 shows that structure 425 includes an extension element 433 and a support 434. The top view of structure 425 is shown in FIG. 7. The structure 425 is preferably made of a low CTE metal such as Invar or Super Invar. The structure 425 attaches rigidly, via the support 434, to the base 460 which can be made of any type of material and is not restricted to low CTE materials. Extensions 427C, 427D, as shown in FIG. 5, in the first portions 421C, 421D are disposed through slots 426A and 426B cut into structure 425 as shown in FIG. 7, thereby enabling truncated spheres 428C, 428D to seat on three small spheres, known in the art, disposed around each circular hole 429C, 429D cut into structure 425. The centers of the truncated spheres 428C, 428D are center points that would have existed for an untruncated sphere. The centers of rotation for mount assemblies 420C, 420D are the same as the centers of the truncated spheres 428C, 428D.

The advantage of using truncated spheres in mount assemblies 420C, 420D is that the centers of rotation remain on the common plane that passes through the centers of spherically shaped objects placed in nests 410A, 410B without obstructing the path between the nests. As such, there is an unobstructed line of sight between the spherically shaped objects. By eliminating the obstruction, a laser tracker interferometer can accurately measure the distance between nests, as explained previously.

As shown in FIG. 4, ball slides 424A, 424B allow mounted artifact 400 to move along a line parallel to the line that connects the centers of spherically shaped objects placed in nests 410A, 410B. By allowing this free movement, thermal expansion in base 460 does not cause stresses to develop in mounted artifact 400. Such stresses can cause bending of first and second structural elements 450A, 450B, resulting in changes in the distance between nests 410A, 410B.

In other exemplary embodiments, the mount assemblies at one end of the base 460 can be fixed and the other mount assemblies can be allowed to move. For example, combined mount assemblies 420A, 420B could be fixed to base 460, structure 425 could be put on a ball slide, and combined mount assemblies 420E, 420F could also be put on a ball slide.

Errors that can occur in a segment containing two structural components have been described herein, as in FIG. 2. By keeping the centers of spherically shaped objects in nests at the same level as the plane that connects the centers of rotation of the mount assemblies, these errors are minimized, as described with respect to FIGS. 1 and 6. In addition, any displacement in the positions of the mount assemblies (resulting, for example, from a compliant base) results in only a cosine error so that the change in the distance between the nests is negligible.

As described herein, there are advantages in having the exemplary scale bars described herein in two segments as shown in FIGS. 4 and 5, rather than one longer segment. First, it is sometimes necessarily to measure one or more scale bar artifacts placed in a variety of positions and orientations. Because of extension element 433, for example, it is possible to arrange multiple scale bars placed in different orientations that occupy the same central region in space. Second, it is sometimes necessary to construct very long scale bars. Beyond a certain length, it is difficult to obtain structural components (such as 450A, 450B) that are stiff enough to avoid problems with excessive bending of the bar. In such cases, it may be better to break the scale bar into two segments as shown in FIGS. 4 and 5.

While preferred embodiments have been shown and described, various modifications and substitutions may be made thereto without departing from the spirit and scope of the invention. Accordingly, it is to be understood that the present invention has been described by way of illustrations and not limitation.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A scale-bar artifact, comprising:
   a base;
   a structural component;
   a spherically shaped object having a center;
   at least a first and a second nest disposed on the structural component and configured to receive the spherically shaped object;
   at least three mounting assemblies, each mounting assembly including a first portion and a second portion, wherein:
     the second portion of each mounting assembly is coupled to the base;
     the first portion of each mounting assembly is coupled to the structural component;
     the first portion and second portion of each mounting assembly are in mutual contact;
     each mounting assembly has a center of rotation; and
     the centers of rotation of the three mounting assemblies are not collinear, the three centers sharing a common plane with the center of the spherically shaped object when received by the first nest and the center of the spherically shaped object when received by the second nest.

2. The scale-bar artifact as claimed in claim 1, wherein at least one of the three mounting assemblies has a degree of freedom allowing movement, at least approximately, along a line parallel to a line of sight between the spherically shaped object when received by the first nest and the center of the spherically shaped object when received by the second nest.

3. The scale-bar artifact as claimed in claim 2, wherein the line of sight is unobstructed.

4. The scale-bar artifact as claimed in claim 1, wherein the first portions and the second portions of each of the three mounting assemblies are kinematically coupled respectively to the structural component and the base.

5. The scale-bar artifact as claimed in claim 1, wherein each of the first and second nest receives the spherically shaped object and is held in place by a magnetic force.

6. A scale-bar artifact, comprising:
   a base;
   a spherically shaped object having a center;
   a first structural component section and a second structural component section;
   at least two nests configured to receive the spherically shaped object, wherein a first of the at least two nests is coupled to the first structural component section and a second of the at least two nests is coupled to the second structural component section;
   a first set of at least three mounting assemblies and a second set of at least three mounting assemblies, each mounting assembly including a first portion and a second portion, wherein,
     the second portion of each mounting assembly is coupled to the base;
     the first portion of each mounting assembly within the first set of three mounting assemblies is coupled to the first structural component section;
     the first portion of each mounting assembly within the second set of three mounting assemblies is coupled to the second structural component section;
     the first portion and second portion of each mounting assembly are in mutual contact;
     each mounting assembly has a center of rotation;
     the centers of rotation of the mounting assemblies from among the first set of at least three mounting assemblies are not collinear;
     the centers of rotation of the mounting assemblies from among the second set of at least three mounting assemblies are not collinear; and
     the centers of rotation from among the first set of at least three mounting assemblies and the centers of rotation from among the second set at least three mounting assemblies share a common place with the center of the spherically shaped object when received by the first nest and the center of the spherically shaped object when received by the second nest.

7. The scale-bar artifact as claimed in claim 6, wherein:
   at least one of the mounting assemblies from among the first set of at least three mounting assemblies has a degree of freedom allowing movement, at least approximately, along a line parallel to a line of sight connecting the spherically shaped object when received by the first of the at least two nests and the spherically shaped object when received by the second of the at least two nests; and
   at least one of the mounting assemblies from among the second set of at least three mounting assemblies has a degree of freedom allowing movement, at least approximately, along a line parallel to the line of sight.

8. The scale-bar artifact as claimed in claim 6, wherein the line of sight is unobstructed.

9. The scale-bar artifact as claimed in claim 6, wherein the first portions and the second portions of each of the mounting assemblies from among the first set of at least three mounting assemblies and the second set of at least three mounting assemblies are kinematically coupled respectively to the first and second structural component sections, and the base.

10. The scale-bar artifact as claimed in claim 6, wherein each of the at least two nests receive the spherically shaped object and are held in place by a magnetic force.

11. The scale-bar artifact as claimed in claim 6, wherein:
   for at least one of the mounting assemblies from among the first set of at least three mounting assemblies, the first portion includes a first truncated sphere having a sphere center located at the center of rotation of the first truncated sphere; and
   for at least one of the mounting assemblies from among the second set of at least three mounting assemblies, the first portion includes a second truncated sphere having a sphere center located at the center of rotation of the second truncated sphere.

12. A scale-bar artifact, comprising:
   a base;
   a first structural component section and a second structural component section;
   at least two nests configured to receive a spherically shaped object having a center, wherein a first of the at least two nests is coupled to the first structural component section and a second of the at least two nests is coupled to the second structural component section;
   a first set of at least three mounting assemblies and a second set of at least three mounting assemblies, each mounting assembly including a first portion and a second portion, wherein,
   the second portion of each mounting assembly is coupled to the base;

the first portion of each mounting assembly within the first set of three mounting assemblies is coupled to the first structural component section;

the first portion of each mounting assembly within the second set of three mounting assemblies is coupled to the second structural component section;

the first portion and second portion of each mounting assembly are in mutual contact;

each mounting assembly has a center of rotation;

the centers of rotation of the mounting assemblies from among the first set of at least three mounting assemblies and the second set of at least three mounting assemblies and the centers of the spherically shaped objects share a common plane;

for at least one of the mounting assemblies from among the first set of at least three mounting assemblies, the first portion includes a first truncated sphere having a sphere center located at the center of rotation; and for at least one of the mounting assemblies from among the second set of at least three mounting assemblies, the first portion includes a second truncated sphere having a sphere center located at the center of rotation.

13. The scale-bar artifact as claimed in claim 12, wherein:

at least one of the mounting assemblies from among the first set of at least three mounting assemblies has a degree of freedom allowing movement, at least approximately, along a line parallel to a line of sight connecting the spherically shaped object place in the at least two nests; and at least one of the mounting assemblies from among the second set of at least three mounting assemblies has a degree of freedom allowing movement, at least approximately, along a line parallel to the line of sight connecting the spherically shaped object placed in the at least two nests.

14. The scale-bar artifact as claimed in claim 12, wherein the line of sight is unobstructed.

15. The scale-bar artifact as claimed in claim 12, wherein the first portions and the second portions of each of the mounting assemblies from among the first set of at least three mounting assemblies and the second set of at least three mounting assemblies are kinematically coupled respectively to the first and second structural component sections, and the base.

16. The scale-bar artifact as claimed in claim 12, wherein each of the at least two nests receive the spherically shaped object and are held in place by magnetic force.

* * * * *

UNITED STATES PATENT AND TRADEMARK OFFICE
CERTIFICATE OF CORRECTION

PATENT NO.         : 8,051,575 B2
APPLICATION NO.    : 12/907658
DATED              : November 8, 2011
INVENTOR(S)        : Robert E. Bridges et al.

Page 1 of 1

It is certified that error appears in the above-identified patent and that said Letters Patent is hereby corrected as shown below:

In the Claims:

Column 12, line 16, Claim 6, delete "place" and insert -- plane --, therefor.

Column 14, line 3, Claim 13, delete "place" and insert -- placed --, therefor.

Column 14, line 11, Claim 14, delete "12" and insert -- 13 --, therefor.

Signed and Sealed this
Sixteenth Day of September, 2014

Michelle K. Lee
*Deputy Director of the United States Patent and Trademark Office*